J. E. Stanwood,
Pipe Cutter.

N° 23,792. Patented Apr. 26, 1859.

Witnesses: Inventor.
Laurence Lyons Joseph E. Stanwood
Arthur Neill

UNITED STATES PATENT OFFICE.

JOSEPH E. STANWOOD, OF MALDEN, MASSACHUSETTS.

GAS-PIPE CUTTER.

Specification of Letters Patent No. 23,792, dated April 26, 1859.

*To all whom it may concern:*

Be it known that I, JOSEPH E. STANWOOD, of Malden, in the county of Middlesex and State of Massachusetts, have invented an Improved Gas-Pipe or Rod Cutter; and I do hereby declare that the same is fully described and represented in the following specification and the accompanying drawings, of which—

Figure 1:
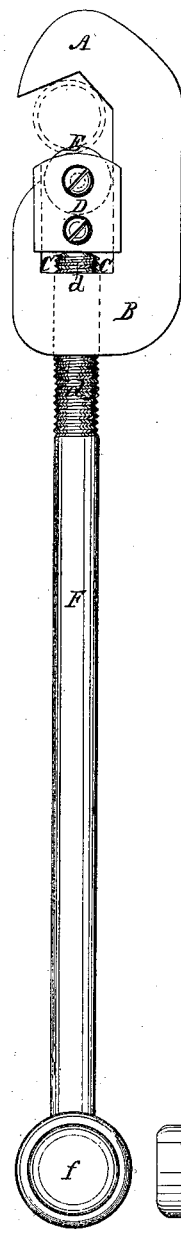
Figure 2:
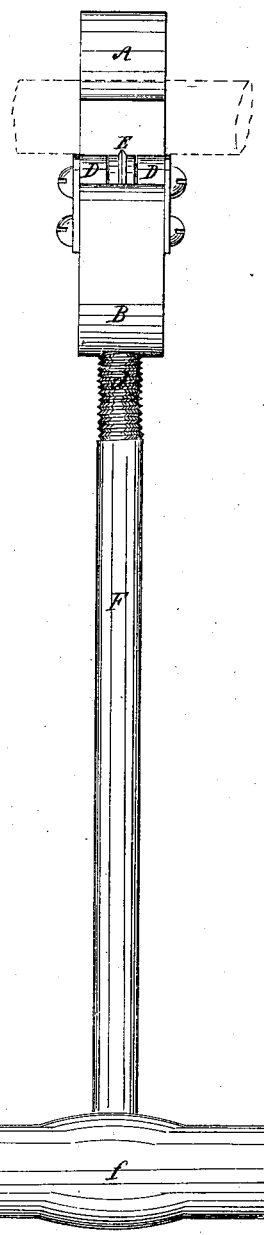

Figure 1 is a side elevation; Fig. 2, an edge view, and Fig. 3, a longitudinal section of it.

Pipe or rod cutters as heretofore constructed have a chisel for a cutting tool, and when such is borne against a pipe and the implement turned around on the same such chisel will remove a shaving from the pipe. One great objection to such a pipe cutter is the frequent breakage of the point or cutting edge of the chisel.

In my improved pipe cutter I do not have a chisel, but employ a cutter wheel or disk having a sharp periphery. This wheel, while the instrument is in use, is to be forced and rolled against and around the pipe or rod and so as to cut into it by pressure and a rolling action. It does not remove or raise a shaving before it, but simply embeds itself in the metal or material of the pipe or rod and cuts a path therein while being revolved or rolled about the pipe or rod. It thus operates entirely different from a chisel and is in no respect so liable to be broken. It performs its duty of cutting off the pipe with far less labor and much more ease than is the case with the chisel and in every respect is preferable thereto.

Figure 3:
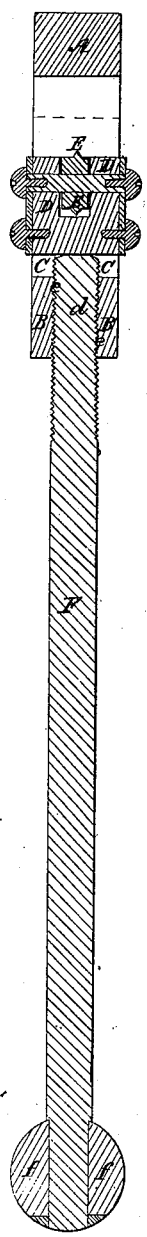

In the drawings A, denotes a claw or hook projecting from a block B, shaped as shown in the figures and particularly with a recess C, for the reception of the cutter carrier D, the opposite sides of such recess being parallel to each other. The said carrier D, supports a circular wheel cutter E, in its end next adjacent to the claw A, the cutter E, being free to revolve or turn on its axis. Furthermore, the said carrier is applied to the recess C, so as to be capable of sliding therein toward and away from the claw, and of being forced toward such claw by a male screw *d*, formed on a rod F, and operating in a female screw *e*, cut in the block and with reference to the recess thereof as shown in Fig. 3. The rod F, carries at its outer end a handle *f*.

In using the improved pipe cutter, the pipe to be cut rests in the angular recess of the claw, the cutter wheel being forced against the pipe while the whole instrument is being turned about the pipe so as to cause the wheel cutter to roll transversely around the same.

I do not claim a pipe or rod cutter having a chisel with a screw or means of forcing such chisel toward the claw or pipe rest, but What I do claim is—

1. My improved pipe or round rod cutter as provided with a rotary cutting wheel to operate in conjunction with the claw or pipe rest as specified.

2. I also claim the arrangement of the cutting wheel carrier in a recess C, (formed in the claw block B,) in combination with the arrangement of the adjustable screws *d*, *e*, and handle rod F, with respect to the said recess and the cutter wheel carrier, the whole being as specified.

JOSEPH E. STANWOOD.

Witnesses:
R. H. EDDY,
LAURENCE LYONS.